(12) United States Patent
Chang

(10) Patent No.: US 8,861,226 B2
(45) Date of Patent: Oct. 14, 2014

(54) POWER FILTER OUTPUT ARCHITECTURE OF A POWER SUPPLY

(75) Inventor: Hsiu-Cheng Chang, Taipei (TW)

(73) Assignee: Sea Sonic Electronics Co., Ltd., Taipei (TW)

( * ) Notice: Subject to any disclaimer, the term of this patent is extended or adjusted under 35 U.S.C. 154(b) by 228 days.

(21) Appl. No.: 13/610,304

(22) Filed: Sep. 11, 2012

(65) Prior Publication Data

US 2013/0278354 A1    Oct. 24, 2013

(30) Foreign Application Priority Data

Apr. 19, 2012 (TW) .............................. 101207242 U

(51) Int. Cl.
*H05K 7/02* (2006.01)
*H05K 7/04* (2006.01)

(52) U.S. Cl.
USPC ...................... 361/811; 361/679.01; 361/719

(58) Field of Classification Search
CPC .... H01R 13/6633; H01R 12/7088; H02J 5/00
USPC ............ 361/600–601, 679.01, 719–723, 785, 361/747, 792, 796, 807–812; 323/271–272
See application file for complete search history.

(56) References Cited

U.S. PATENT DOCUMENTS

| | | | |
|---|---|---|---|
| 4,942,400 A * | 7/1990 | Tarzaiski et al. ............... | 341/155 |
| 6,278,264 B1 * | 8/2001 | Burstein et al. ............... | 323/282 |
| 7,901,242 B2 * | 3/2011 | Chen ............................. | 439/502 |
| 8,405,369 B1 * | 3/2013 | Kahn ............................ | 323/271 |
| 8,456,855 B2 * | 6/2013 | Chen et al. .................... | 361/782 |
| 2004/0201279 A1 * | 10/2004 | Templeton ..................... | 307/11 |
| 2007/0279826 A1 * | 12/2007 | Lin et al. ....................... | 361/119 |
| 2008/0002337 A1 * | 1/2008 | Hsu et al. ...................... | 361/600 |
| 2010/0177472 A1 * | 7/2010 | Chang ...................... | 361/679.02 |
| 2010/0277267 A1 * | 11/2010 | Bogert et al. ................. | 336/221 |
| 2011/0291477 A1 * | 12/2011 | Chen et al. ..................... | 307/31 |
| 2012/0320538 A1 * | 12/2012 | Wu et al. ....................... | 361/748 |
| 2013/0271925 A1 * | 10/2013 | Ikuta ............................ | 361/736 |

* cited by examiner

*Primary Examiner* — Adrian S Wilson
*Assistant Examiner* — Abhishek Rathod
(74) *Attorney, Agent, or Firm* — Muncy, Geissler, Olds & Lowe, P.C.

(57) ABSTRACT

A power filter output architecture of a power supply includes a power conversion circuit board, a filter inductor, and a power output port. The power conversion circuit board includes a conversion circuit which converts an input power into at least one converted power, a power output circuit arranged at an edge of the power conversion circuit board, and a ground circuit arranged between the conversion circuit and the power output circuit. The filter inductor includes a first pin which obtains the converted power, an inductor body which receives the converted power and induces it to produce a filtered power, and a second pin which crosses the ground circuit to connect to the power output circuit. The power output port includes a plurality of power output terminals disposed on the power output circuit to obtain the filtered power, and a plurality of ground terminals connected to the ground circuit.

5 Claims, 2 Drawing Sheets

POWER FILTER OUTPUT ARCHITECTURE OF A POWER SUPPLY

FIELD OF THE INVENTION

The present invention relates to a power filter output architecture, and particularly to a power filter output architecture of a power supply.

BACKGROUND OF THE INVENTION

A common power supply includes a filter rectification unit, a boost unit (including a conventional power factor correction unit having a boost function) and a switchable power conversion unit. These elements are mostly integrated onto a circuit board. The filter rectification unit of the power supply connects to a power source to obtain an input power first, and then the boost unit (also including a conventional power factor correction unit) modulates the voltage of the input power to generate a boost power. Finally, the boost power is converted into an output power by the power conversion unit to drive at least one load.

In general, to ensure the quality of the supplied power, the output power generated by the power conversion unit must be further processed by a rectification filter circuit in order to serve as a DC power to drive computer components. This rectification filter circuit is commonly arranged at a secondary side of the power conversion unit and mainly includes an inductor and a capacitor. The rectified and filtered output power is then outputted to a rear-end computer component through at least one module slot. The rear end of the rectification filter circuit on a motherboard sequentially includes a power output circuit and a ground circuit to which the module slot is respectively connected. The power output circuit obtains the output power, whereas the ground circuit allows the module slot to be grounded. However, the current of the ground circuit will flow back to the front-end circuit of the motherboard because its flowing path passes through the power output circuit. Thus the reflux current in the ground circuit is lost to further reduce the amount of the reflux current.

SUMMARY OF THE INVENTION

Therefore the primary object of the present invention is to provide a solution to the problem in the conventional ground circuit that the amount of the reflux current in the ground circuit is reduced when passing through the power output circuit.

To achieve the above object, the present invention provides a power filter output architecture of a power supply. The power filter output architecture includes a power conversion circuit board, and a filter inductor and a power output port that are disposed on the power conversion circuit board. The power conversion circuit board includes a conversion circuit which obtains an input power from an external power source and converts the input power into at least one converted power having different voltage levels, a power output circuit arranged at an edge of the power conversion circuit board, and a ground circuit arranged between the conversion circuit and the power output circuit. The filter inductor includes a first pin connected to the conversion circuit to obtain the converted power, a second pin crossing the ground circuit to connect to the power output circuit, and an inductor body receiving the converted power and inducing the converted power to produce a filtered power that passes through the second pin to reach the power output circuit. The power output port includes a plurality of power output terminals disposed on the power output circuit to obtain the filtered power and a plurality of ground terminals connected to the ground circuit.

In one embodiment, the inductor body includes a coil portion respectively connected to the first pin and the second pin, and a magnetic core portion disposed in the coil portion.

In one embodiment, the converted power is a +12V DC power.

In one embodiment, the power output port further includes a connection portion to fix the power output terminals and the ground terminals thereon.

In one embodiment, the power output port further includes at least one gap between any two of the ground terminals to allow the second pin to cross the ground circuit to connect to the power output circuit.

In one embodiment, the filter inductor further includes an insulating layer encircling an outer surface of the second pin.

In one embodiment, the conversion circuit includes a rectification filter unit connected to the external power source, a power factor correction unit connected to the rectification filter unit, a transformer, a pulse width modulation (PWM) unit, a switch, and a rectification unit.

In the power filter output architecture of a power supply of the present invention, the ground circuit is arranged between the conversion circuit and the power output circuit, and the first pin of the filter inductor connects to the conversion circuit to obtain the converted power while the second pin of the filter inductor crosses the ground circuit to connect to the power output circuit. Thus, the path of the current of the ground circuit flowing back to the front-end circuit of the motherboard does not need to pass through the power output circuit. Therefore a more efficient current flow is provided, and reduction of the amount of the reflux current is also prevented.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
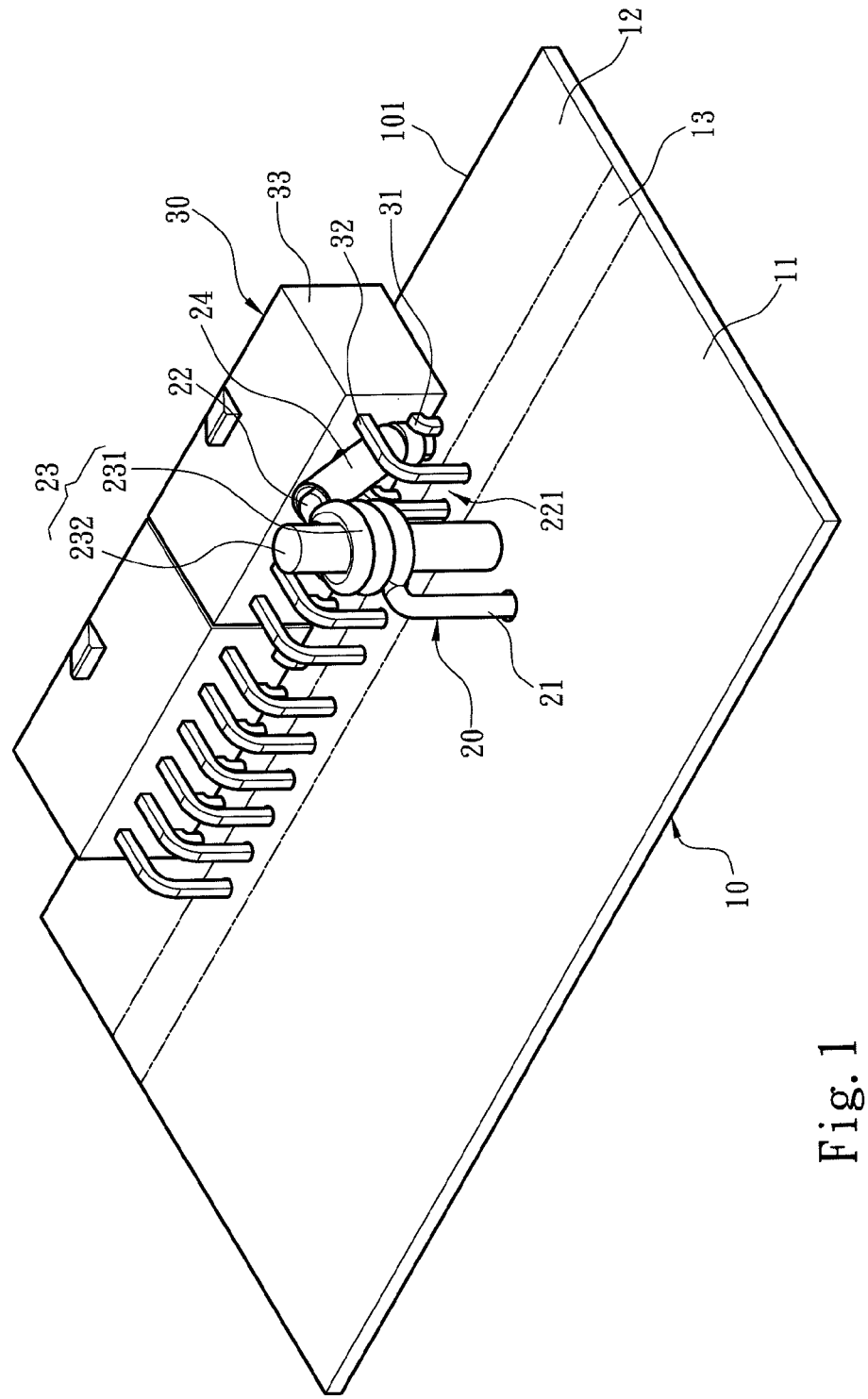
FIG. 1 is an elevation view of one embodiment of the power filter output architecture of a power supply of the present invention.
Figure 2:
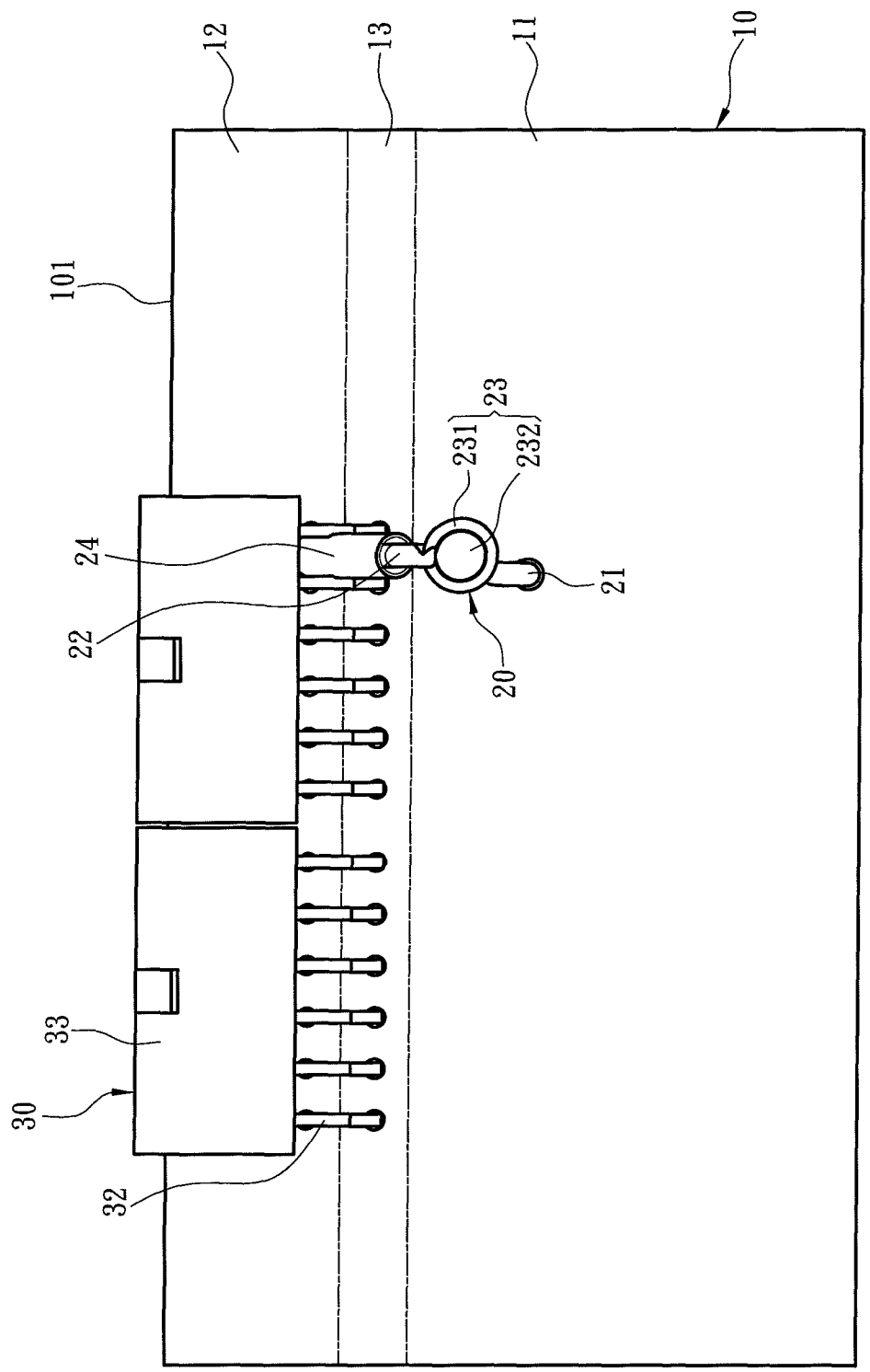
FIG. 2 is a top view of the embodiment of the power filter output architecture of a power supply of the present invention.

Please refer to FIGS. 1 and 2 which respectively show an elevation view and a top view of the power filter output architecture of a power supply of the present invention. As shown in FIGS. 1 and 2, the power filter output architecture of a power supply of the present invention includes a power conversion circuit board 10, and a filter inductor 20 and a power output port 30 that are disposed on the power conversion circuit board 10.

The power conversion circuit board 10 includes a conversion circuit 11 which obtains an input power from an external power source and converts the input power to at least one converted power having different voltage levels, a power output circuit 12 arranged at an edge 101 of the power conversion circuit board 10, and a ground circuit 13 arranged between the conversion circuit 11 and the power output circuit 12. Taking a common power supply architecture as an example, the conversion circuit 11 includes a rectification filter unit connected to the external power source to obtain the input power, a power factor correction unit connected to the rectification filter unit, a transformer, a pulse width modulation (PWM) unit, a switch, and a rectification unit (not shown in the drawings). (The above-mentioned architecture of a common power supply is known to a person having ordinary skill in the art, thus the operation thereof is omitted herein.) The transformer of the conversion circuit 11 generates the converted power at the secondary side. In this embodiment, the converted power is a +12V DC power.

In order to provide computer components at a rear end of the power supply with a stable and high-quality DC power, the filter inductor 20 is disposed at the rear end of the conversion circuit 11 on the power conversion circuit board 10. The filter inductor 20 includes a first pin 21 connected to the conversion circuit 11 to obtain the converted power, a second pin 22 crossing the ground circuit 13 to connect to the power output circuit 12, and an inductor body 23 receiving the converted power and inducing the converted power to produce a filtered power that passes through the second pin 22 to reach the power output circuit 12. The inductor body 23 includes a coil portion 231 respectively connected to the first pin 21 and the second pin 22, and a magnetic core portion 232 disposed in the coil portion 231.

Moreover, in order to output the filtered power to the rear-end computer components, the power conversion circuit board 10 further includes a power output port 30. The power output port 30 includes a plurality of power output terminals 31 disposed on the power output circuit 12 to obtain the filtered power, a plurality of ground terminals 32 connected to the ground circuit 13, and a connection portion 33 to fix the power output terminals 31 and the ground terminals 32 thereon. The power output terminals 31 and the ground terminals 32 are connected to the connection portion 33 which may be further connected to external computer components so that the computer components are electrically connected with the power output terminals 31 and the ground terminals 32. In the present invention, to coordinate the positions of the power output circuit 12 and the ground circuit 13, the power output circuit 12 is arranged at an edge 101 of the power conversion circuit board 10, while the ground circuit 13 is arranged between the power output circuit 12 and the conversion circuit 11. The power output terminals 31 are closer to the edge 101 of the power conversion circuit board 10 than the ground terminals 32.

Since the second pin 22 of the filter inductor 20 must pass through the ground terminals 32 and cross the ground circuit 13 to connect to the power output circuit 12, in one embodiment, the power output port 30 further includes at least one gap 221 between any two of the ground terminals 32 for the second pin 22 to pass through. In addition, to prevent the second pin 22 of the filter inductor 20 from directly contacting the ground terminals 32 when passing through the gap 221, the filter inductor 20 further includes an insulating layer 24 encircling an outer surface of the second pin 22.

As a conclusion, in the power filter output architecture of a power supply of the present invention, the ground circuit on the power conversion circuit board is arranged between the conversion circuit and the power output circuit, and the second pin of the filter inductor crosses the ground circuit to connect to the power output circuit. Thus, the path of the current of the ground circuit flowing back to the front-end circuit of the motherboard does not need to pass through the power output circuit. Therefore a more efficient current flow is provided, and reduction of the amount of the reflux current is also prevented.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power filter output architecture of a power supply, comprising:
   a power conversion circuit board comprising a conversion circuit which obtains an input power from an external power source and converts the input power into at least one converted power having different voltage levels, a power output circuit arranged at an edge of the power conversion circuit board, and a ground circuit arranged between the conversion circuit and the power output circuit;
   a filter inductor which is disposed on the power conversion circuit board and comprises a first pin connected to the conversion circuit to obtain the at least one converted power, a second pin crossing the ground circuit to connect to the power output circuit, and an inductor body receiving the at least one converted power and inducing the converted power to produce a filtered power that passes through the second pin to reach the power output circuit;
   a power output port comprising a plurality of power output terminals disposed on the power output circuit to obtain the filtered power, and a plurality of ground terminals connected to the ground circuit; and
   wherein the power output port comprises at least one gap between any two of the plurality of ground terminals to allow the second in to cross the ground circuit to connect to the power output circuit.

2. The power filter output architecture of claim 1, wherein the inductor body comprises a coil portion respectively connected to the first pin and the second pin, and a magnetic core portion disposed in the coil portion.

3. The power filter output architecture of claim 1, wherein the converted power is a +12V DC power.

4. The power filter output architecture of claim 1, wherein the power output port comprises a connection portion to fix the plurality of power output terminals and the plurality of ground terminals thereon.

5. The power filter output architecture of claim 1, wherein the filter inductor comprises an insulating layer encircling an outer surface of the second pin.

* * * * *